US012734491B2

(12) United States Patent
Choi

(10) Patent No.: US 12,734,491 B2
(45) Date of Patent: Sep. 15, 2026

(54) HOMOGENIZER WITH A BACK FLUSHING STRUCTURE

(71) Applicant: MICRONOX INC., Seongnam-si (KR)

(72) Inventor: In Soo Choi, Seongnam-si (KR)

(73) Assignee: MICRONOX INC., Seongnam-si (KR)

( * ) Notice: Subject to any disclaimer, the term of this patent is extended or adjusted under 35 U.S.C. 154(b) by 435 days.

(21) Appl. No.: 18/521,843

(22) Filed: Nov. 28, 2023

(65) Prior Publication Data

US 2025/0170537 A1 May 29, 2025

(51) Int. Cl.

| | |
|---|---|
| ***B01F 23/00*** | (2022.01) |
| ***B01F 23/41*** | (2022.01) |
| ***B01F 25/44*** | (2022.01) |
| ***B01F 35/21*** | (2022.01) |
| ***B01F 35/22*** | (2022.01) |
| ***B01F 35/71*** | (2022.01) |

(52) U.S. Cl.
CPC ............ *B01F 23/413* (2022.01); *B01F 25/44* (2022.01); *B01F 35/2113* (2022.01); *B01F 35/2202* (2022.01); *B01F 35/71805* (2022.01)

(58) Field of Classification Search
CPC .... B01F 23/413; B01F 25/44; B01F 35/2202; B01F 35/71805; B01F 35/2113
See application file for complete search history.

(56) References Cited

U.S. PATENT DOCUMENTS 5,984,519 A * 11/1999 Onodera ................. B01F 25/23 516/51
9,656,222 B2 5/2017 Panagiotou et al.

FOREIGN PATENT DOCUMENTS

KR 101073382 B1 * 10/2011 ............... F15D 1/08

OTHER PUBLICATIONS

KR 101073382 B1 Machine Translation (Year: 2011).*

* cited by examiner

*Primary Examiner* — Anshu Bhatia
(74) *Attorney, Agent, or Firm* — CANTOR COLBURN LLP

(57) ABSTRACT

Provided is a homogenizer with a back flushing structure. A homogenizer for homogenizing a raw material comprises a first guiding block 13*a* for guiding the raw material to flow with an operation of a plunger 12; a first flow controlling valve 14*a* connected to the first guiding block 14*a*; an inflow regulating unit 15*a* connected to the first flow controlling valve 14*a*; at least one nano cell block for homogenizing the raw material being inputted through the inflow regulating unit 15*a*; a discharge regulating unit 15*b* for regulating a discharging of the homogenized raw material discharged from the nano cell block 16*a*, 16*b*; a second guiding block 13*b* installed between the plunger 12 and the first guiding block 13*a*; a second flow controlling valve 14*b* for connecting the second guiding block 13*b* to the discharge regulating unit 15*b*; and a heat exchanger 18 connected to the discharge regulating unit.

7 Claims, 4 Drawing Sheets

HOMOGENIZER WITH A BACK FLUSHING STRUCTURE

BACKGROUND OF THE INVENTION

1. Field of the Invention

The present invention relates to a homogenizer with a back flushing structure, in particular with a structure to prevent a raw material from being blocked by making the raw material flow in a reverse direction.

2. Description of the Related Art

A homogenizing process for dispersing a solute or a dispersoid within a solvent or a dispersive medium may be utilized in a food or beverage industry, a pharmaceutical manufacturing industry, a cosmetic industry, an ink industry or an electronic industry. A high pressure may be applied to a solution or a raw material for homogenizing the solution or the raw material, and the solution or the raw material may be homogenized in a course of flowing along a homogenizing means to generate a shear force, an impact, a cavitation phenomenon or the like. Hereby, the solution or the raw material for an ink or a cosmetic may be made into an emulsion where particles below 1 micrometer size are dispersed, or a cell wall of a cultured microorganism may be disrupted. U.S. Pat. No. 9,656,222 discloses a method for reducing a cavitation in an interactive chamber. The homogenizing process may be performed in a homogenizing chamber, and a portion of the solute or the dispersoid may be accumulated in the homogenizing block or the homogenizing chamber to make a pressure for homogenizing be reduced significantly if the raw material flows continuously in one direction. Due to this, the homogenizing process may not proceed effectively. Therefore, it is necessary for a means to prevent such passage blocking phenomenon to be developed. But the prior art doesn't disclose such means.

The present invention has the following purpose for solving the problem of the prior art.

PURPOSE OF THE INVENTION

An object of the present invention is to provide with a homogenizer with a back flushing structure to solve a passage blocking phenomenon by making the raw material flow in a reverse direction if a relatively larger pressure is required in a course of homogenizing resulting from the passage blocking phenomenon.

SUMMARY OF THE INVENTION

According to one embodiment of the present invention. a homogenizer for homogenizing a raw material comprises a first guiding block for guiding the raw material to flow with an operation of a plunger; a first flow controlling valve connected to the first guiding block; an inflow regulating unit connected to the first flow controlling valve; at least one nano cell block for homogenizing the raw material being inputted through the inflow regulating unit; a discharge regulating unit for regulating a discharge of the homogenized raw material discharged from the nano cell block; a second guiding block installed between the plunger and the first guiding block; a second flow controlling valve for connecting the second guiding block to the discharge regulating unit; and a heat exchanger connected to the discharge regulating unit.

According to other embodiment of the present invention, the homogenizer further comprises a detecting unit for detecting a pressure of the nano cell block, and the raw material flows through the second flow controlling valve based on a pressure information detected by the detecting unit.

According to another embodiment of the present invention, the homogenizer further comprises a pressure variation calculating module for calculating a pressure variation of the nano cell block; and a back flushing controlling module for switching a flowing direction of the raw material.

According to still another embodiment of the present invention, an operation of the plunger becomes a proportional control.

According to still another embodiment of the present invention, each at least one nano cell block comprises at least two nano cells.

According to still another embodiment of the present invention, the homogenizer further comprises an ultrasonic unit installed at the heat exchanger.

DETAILED DESCRIPTION OF EXEMPLARY EMBODIMENTS

Exemplary embodiments of the present invention will be described herein below with reference to the accompanying drawings.

Figure 1:
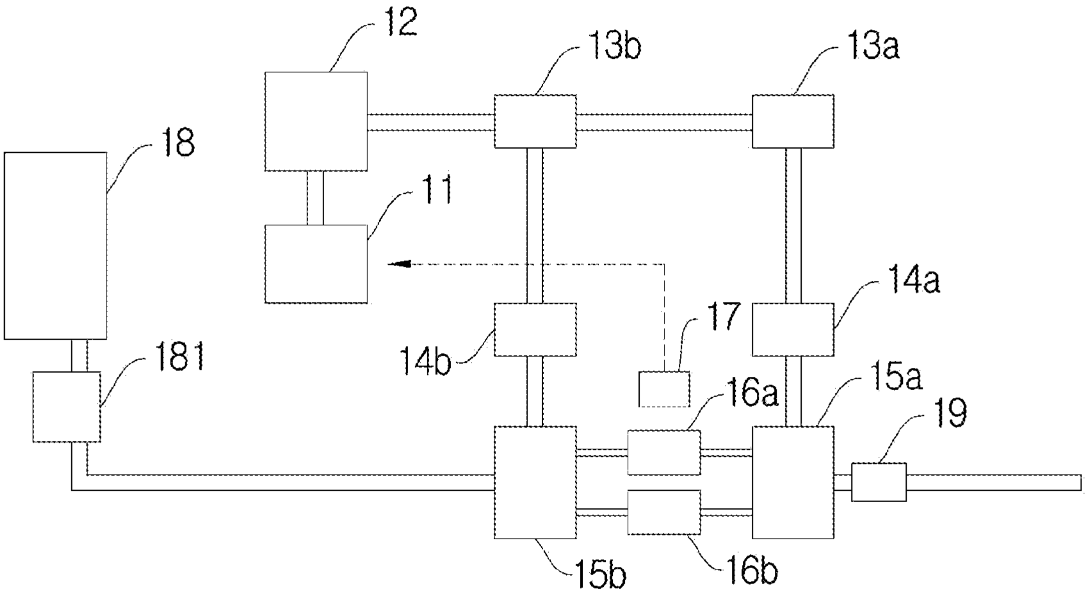
FIG. 1 shows an embodiment of a homogenizer with a back flushing structure according to the present invention.

FIG. 1 shows an embodiment of a homogenizer with a back flushing structure according to the present invention.

Referring FIG. 1, a homogenizer for homogenizing a raw material comprises a first guiding block **13*a* for guiding the raw material to flow with an operation of a plunger 12; a first flow controlling valve 14*a* connected to the first guiding block 14*a*; an inflow regulating unit 15*a* connected to the first flow controlling valve 14*a*; at least one nano cell block 16*a*, 16*b* for homogenizing the raw material inputted through the inflow regulating unit 15*a*; a discharge regulating unit 15*b* for regulating a discharge of the homogenized raw material discharged from the nano cell block 16*a*, 16*b*; a second guiding block 13*b* installed between the plunger 12 and the first guiding block 13*a*; a second flow controlling valve 14*b* for connecting the second guiding block 13*b* to the discharge regulating unit 15*b*; and a heat exchanger 18 connected to the discharge regulating unit 15*b***.

The raw material may consist of a solute and a solvent or a dispersoid and a dispersive medium, and the raw material may be inputted through an inputting unit. When the raw material is inputted within the homogenizer, the plunger 12 may be operated by a pressuring means such as a motor or a pump to deliver the raw material to the homogenizer through a delivering pipe. The raw material can be delivered along the delivering pipe to the first guiding block **13*a* by the operation of the plunger 12. The first guiding block 13***a* may have a function to guide a flow of the raw material properly and to check a flow condition of the raw material. The raw material may flow from the first guiding block 13*a* to the first flow controlling valve 14*a*, and an amount of the flowing material may be controlled by the first flow controlling valve 14*a*. Thereby, the amount of the raw material delivered to the input controlling unit 15*a* may be controlled.

The raw material may flow from the input controlling unit 15*a* to the nano cell block 16*a*, 16*b*, and a homogenizing process of the raw material may be performed at the nano cell block 16*a*, 16*b*. At least one nano cell block 16*a*, 16*b* may be arranged, and the raw material may be homogenized at the nano cell block 16*a*, 16*b* by a sheer force to be applied to the raw material, an impact to a wall of the nano cell block 16*a*, 16*b*, an occurrence of a vortex and a cavitation phenomenon. For example, two nano cell blocks 16*a*, 16*b* may be connected in parallel, thereby when one nano cell block is in a condition of being inoperative, the other nano cell block can be utilized for homogenizing. The raw material homogenized in the nano cell block 16*a*, 16*b* may flow to the discharge controlling unit 15*b*, and the discharge controlling unit 15*b* may control a flow amount of the raw material homogenized in the nano cell block 16*a*, 16*b*, and maintain a temperature of the homogenized raw material. Such raw material may flow from the discharge controlling unit to the heat exchanger 18 for stabilizing.

The heat exchanger 18 may comprise a staying block 181 for controlling the temperature of the raw material and for delivering the raw material to the heat exchanger 18. The dispersoid included in the raw material may be adhered within the nano cell block 16*a*, 16*b* in a course of homogenizing, and a clogging phenomenon in the flowing passage formed within the nano cell block 16*a*, 16*b* may occur due to this. When the clogging phenomenon occurs, the flowing pressure may be lowered significantly compared with the applied pressure. Due to this, it is difficult to homogenize the raw material efficiently in the nano cell block 16*a*, 16*b*.

According to one embodiment of the present invention, the second guiding block 13*b* and the second flow controlling valve 14*b* may be installed in order to prevent the clogging phenomenon. The second guiding block 13*b* may be installed between the plunger 12 and the flow controlling valve 13*a*, and the second flow controlling valve 14*b* may be installed at a flowing passage connecting the second guiding block 13*b* to the discharge controlling unit 15*b*. The second guiding block 13*b* may have a function to switch the flowing passage of the raw material, and for example, the raw material is blocked from flowing to the first guiding block 13*a* by being pressurized by the plunger 12, and the raw material may flow to the discharge controlling unit 15*b* through the second flow controlling valve 14*b*. The input controlling unit 15*a* and the discharge controlling unit 15*b* may have a function to switch the flowing passage of the raw material. The raw material flowing to the discharge controlling unit 15*b* through the second guiding block 13*b* and through the second flow controlling valve 14*b* may flow to the input controlling unit 15*a* through the nano cell block 16*a*, 16*b*. And then, the raw material may be discharged to the outside through the reverse flow block 19.

The clogging phenomenon of the nano cell block 16*a*, 16*b* may be solved by generating a reverse flow. A pressure of the nano cell block 16*a*, 16*b* may be detected by a pressure detecting unit 17 in order to check whether or not a clogging phenomenon occurs, and the pressure information may be transmitted to the controlling module 11. The controlling module 11 may compare the detected pressure with the applied pressure to determine whether or not the clogging phenomenon at the nano cell block 16*a*, 16*b* occurs. When a clogging phenomenon occurs at the nano cell block 16*a*, 16*b*, the flow to the first guiding block 13*a* may be blocked and the first flow controlling valve 14*b* may be closed. And the second flow controlling valve 14*b* may be opened as the flow passage may be switched, and the raw material may flow to the reverse flow block 19 for discharging as the flow direction changes. The induction of the reverse flow may be performed in various ways, not limited to.

Figure 2:
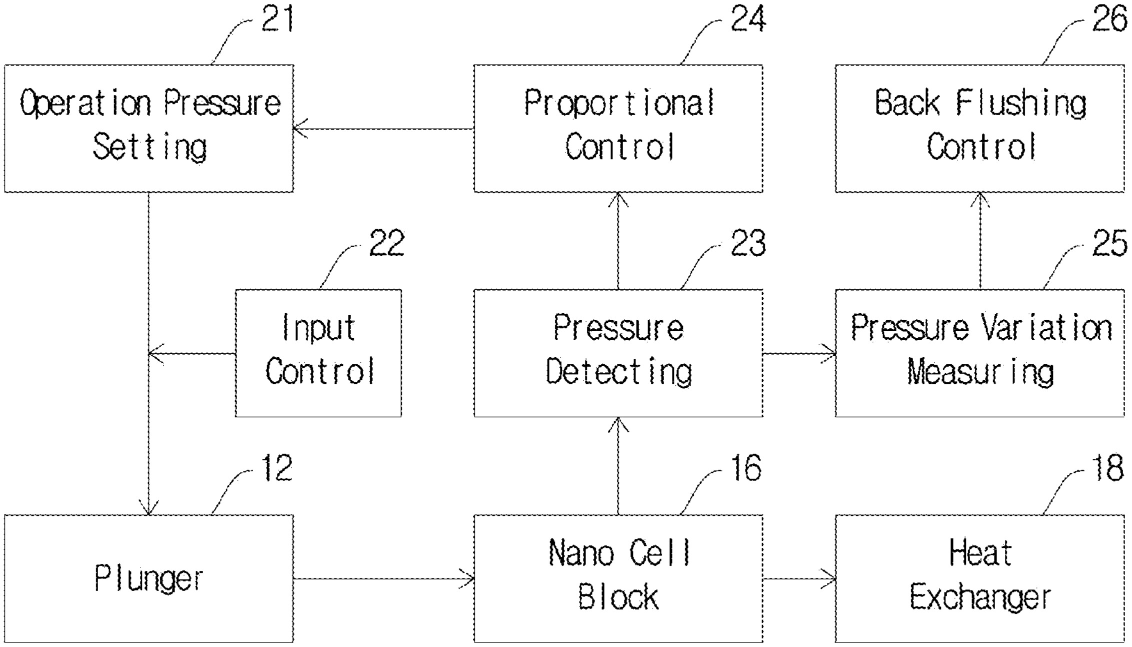
FIG. 2 shows an embodiment of an operation structure of the homogenizer according to the present invention.

FIG. 2 shows an embodiment of an operation structure of the homogenizer according to the present invention.

Referring to FIG. 2, the flow pressure of the raw material may be set by an operating pressure setting module 21, and the plunger 12 may be operated according to a condition set by the operating pressure setting module 21. When the operation of the plunger 12 starts, the raw material may be inputted within the flow passage by an input controlling module 22. The raw material may flow to the nano cell block 16 to be homogenized, and the homogenized raw material may flow to the heat exchanger 18 for stabilizing. The pressure of the nano cell block 16 may be measured to be transmitted to a proportional control module 24 and a pressure variation calculating module 25. The proportional control module 24 may determine the pressure in a proportional way based on the pressure transmitted from the pressure detecting module 23 to transmit the pressure to the operational pressure setting module 21, and thus the pressure of the plunger 12 may be controlled according to the proportional method.

The pressure variation of the nano cell block 16 over time may be calculated by the pressure variation calculating module 25, and if the pressure variation is out of a predetermined range, it may be determined whether the clogging phenomenon has occurred. The measured pressure is out of the predetermined range compared with the applied pressure and a drop pressure condition continues for a predetermined period of time, then it may be determined that the clogging phenomenon has occurred. When it is determined that the clogging phenomenon has occurred, a back flushing process may be initiated by the back flushing controlling module. And the clogging state may be solved by the back flushing process. The back flushing process may be performed in various ways, not limited to.

Figure 3:
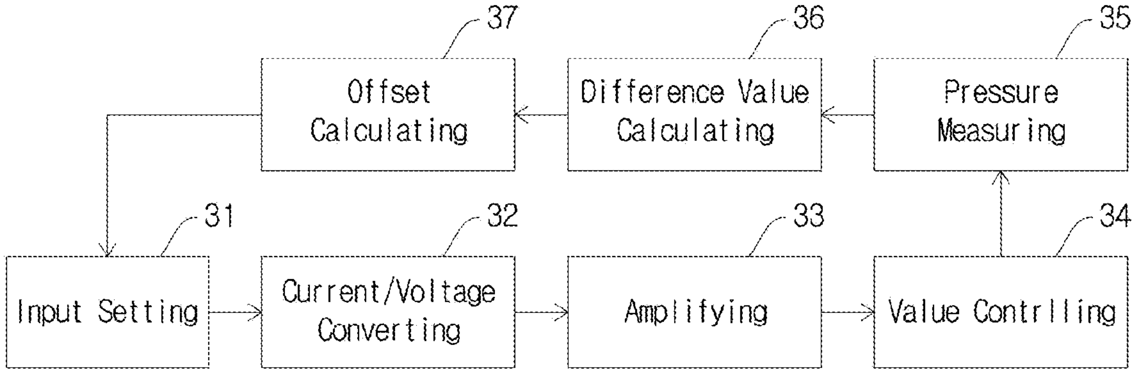
FIG. 3 shows an embodiment of a controlling way of the homogenizer according to the present invention.

FIG. 3 shows an embodiment of a controlling way of the homogenizer according to the present invention.

Referring to FIG. 3, if the pressure applied to the plunger by a pressure setting module 31 is determined, then the pressure may be converted to a current or a voltage by a voltage/current converting module 32. The converted voltage or current may be amplified by an amplifier 33, and an operation of a valve controlling module 34 may be controlled by the amplified current or voltage. The plunger may be operated according to an operation of the valve controlling module 34, and the raw material may flow at a predetermined pressure. The pressure of the nano cell block may be measured by a pressure measuring module 35, and the measured pressure may be transmitted to a difference calculating module 36. A difference between the applied pressure and the measured pressure may occur due to various reasons, and the difference value may be calculated by a difference value calculating module 36. The calculated difference value may be transmitted to an offset calculating module 37 for calculating an offset value. And the calculated offset value may be transmitted to the pressure setting module 31 so that the applied pressure value can be offset to fit the predetermined flow pressure value.

The pressure of the nano cell block may be measured in real time by the pressure measuring module 35, and if the measured pressure value may be different from the predetermined pressure value, then the offset value may be calculated by the offset calculating module 37 for adjusting the pressure value to the predetermined pressure value. The offset process of the pressure setting module 31 according to the offset value calculation may be performed in various ways, not limited to.

Figure 4:
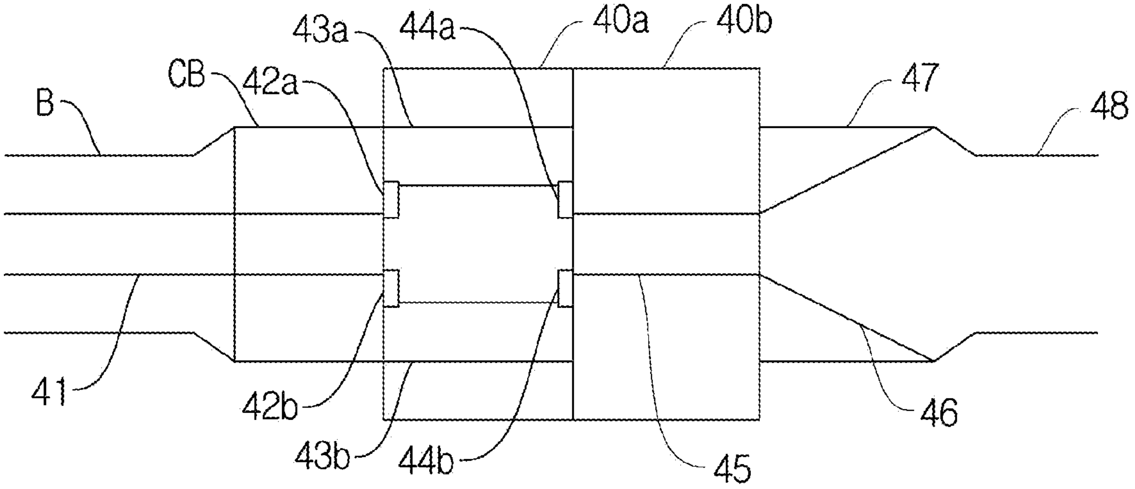
FIG. 4 shows an embodiment of a nano cell block for the homogenizer according to the present invention.

FIG. 4 shows an embodiment of a nano cell block for the homogenizer according to the present invention.

Referring to FIG. 4, each at least one nano cell block 16*a*, 16*b* may comprise at least two nano cells 40*a*, 40*b*. An inflowing passage 41 for a flow of the raw material may be formed within a base frame B. The raw material flowing along the inflowing passage 41 may enter the first nano cell 40*a*. The first and second nano cell 40*a*, 40*b* may have a cylindrical shape in general and have a similar or identical shape each other. A first and second guiding passage 43*a*, 43*b* may be formed at the first nano cell 40*a*, and the raw material flowing along the inflowing passage 41 may flow to the first and second guiding passage 43*a*, 43*b* via a first and second flowing gap 42*a*, 42*b*. The first and second guiding passage 43*a*, 43*b* may have a similar or identical shape and a structure of penetrating the first nano cell 40*a*. The raw material flowing along the first and second guiding passage 43*a*, 43*b* may flow in a direction toward a center of a second surface of the first nano cell 40*a* at an end part of the first nano cell 40*a* after flowing along the third and fourth flowing gap 44*a*, 44*b*. And the raw material may be flow along a third flowing passage 45 formed at the second nano cell 40*b*.

The third flowing passage 45 may extend along a longitudinal centering line of the second nano cell 40*b*, and the raw material flowing the third flowing passage 45 may flow to a discharging block 47. A discharge guiding passage 46 connected to the third flowing passage 45 may be formed at the discharging block 47, and a cross sectional size of the discharge guiding passage 46 may increase along an extending direction. The discharge guiding passage 46 may be connected to a discharging passage 48. A width and depth of each flowing gap 42*a*, 42*b*, 44*a*, 44*b* may become 50 to 150 μm, preferably 60 to 85 μm, not limited to. A cross sectional size of each flowing gap 42*a*, 42*b*, 42*c*, 42*d* may increase gradually along the extending direction, and may have a curved shape, not limited to.

Figure 5:
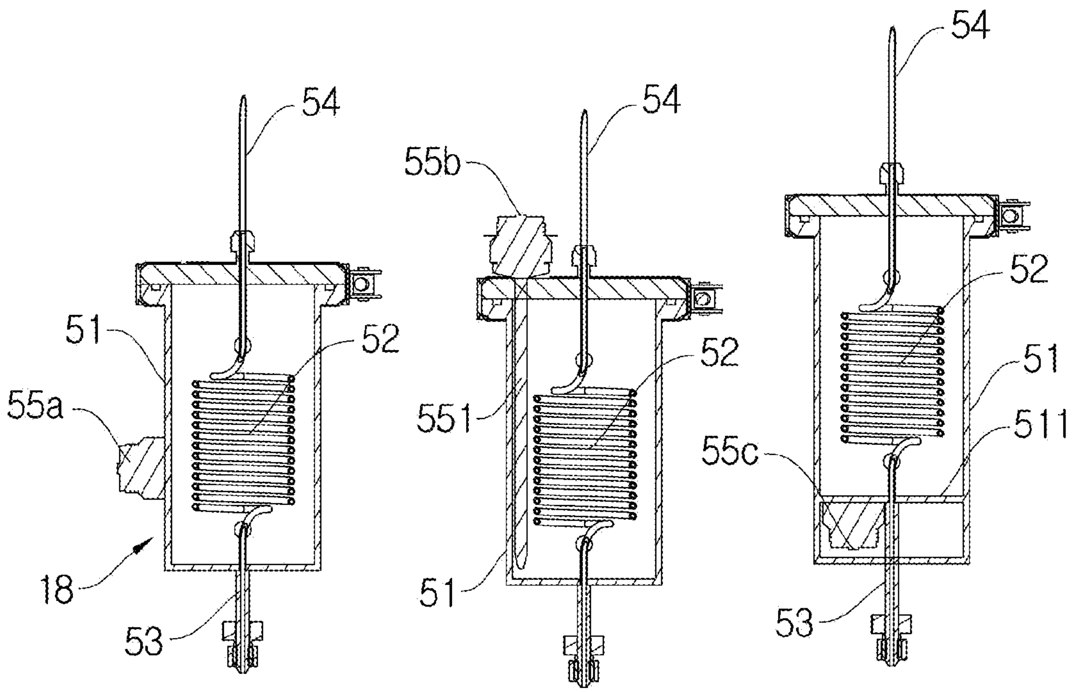
FIG. 5 shows an embodiment of a heat exchanger for the homogenizer according to the present invention.

FIG. 5 shows an embodiment of a heat exchanger for the homogenizer according to the present invention.

Referring to FIG. 5, the heat exchanger 18 may comprise a housing 51; a heat exchanging tube 52 formed within the housing 51 and with a coil shape; an entering tube 53 for transferring the homogeneous solution to the heat exchanging tube 52; and a discharging tube 54 for discharging the homogeneous solution from the heat exchanging tube 52 to a storing tank for storing the homogeneous solution. A coolant tube for guiding a coolant within the heat exchanger 18 may be arranged. The ultrasonic wave units 55*a*, 55*b*, 55*c* may be installed at various places of the housing 51. The ultrasonic wave units 55*a*, 55*b*, 55*c* may be installed at a round surface of the housing 51, may be installed at a cover of the housing 51, or may be installed at a lower surface of the housing.

When the ultrasonic wave unit 55*a* is installed at the cover of the housing 51, an ultrasonic wave transferring member 551 may be coupled to the ultrasonic wave unit 55*a* for applying the ultrasonic wave to the homogenous solution flowing within the housing 51. When the ultrasonic wave unit 55*c* is placed under the housing 51, an ultrasonic wave transferring plate 511 may be installed under the housing 51. A plurality of vibrating elements may be placed at the transferring plate 511, and the ultrasonic wave may be guided in a predetermined direction by the vibrating elements. The ultrasonic wave unit 55*a*, 55*b*, 55*c* may be arranged at various places of the heat exchanger 18 to apply the ultrasonic wave to the homogeneous solution flowing along the heat exchanging tube 52. And the ultrasonic wave unit 55*a*, 55*b*, 55*c* may have a proper structure to apply the ultrasonic wave to the homogeneous solution.

Figure 6:
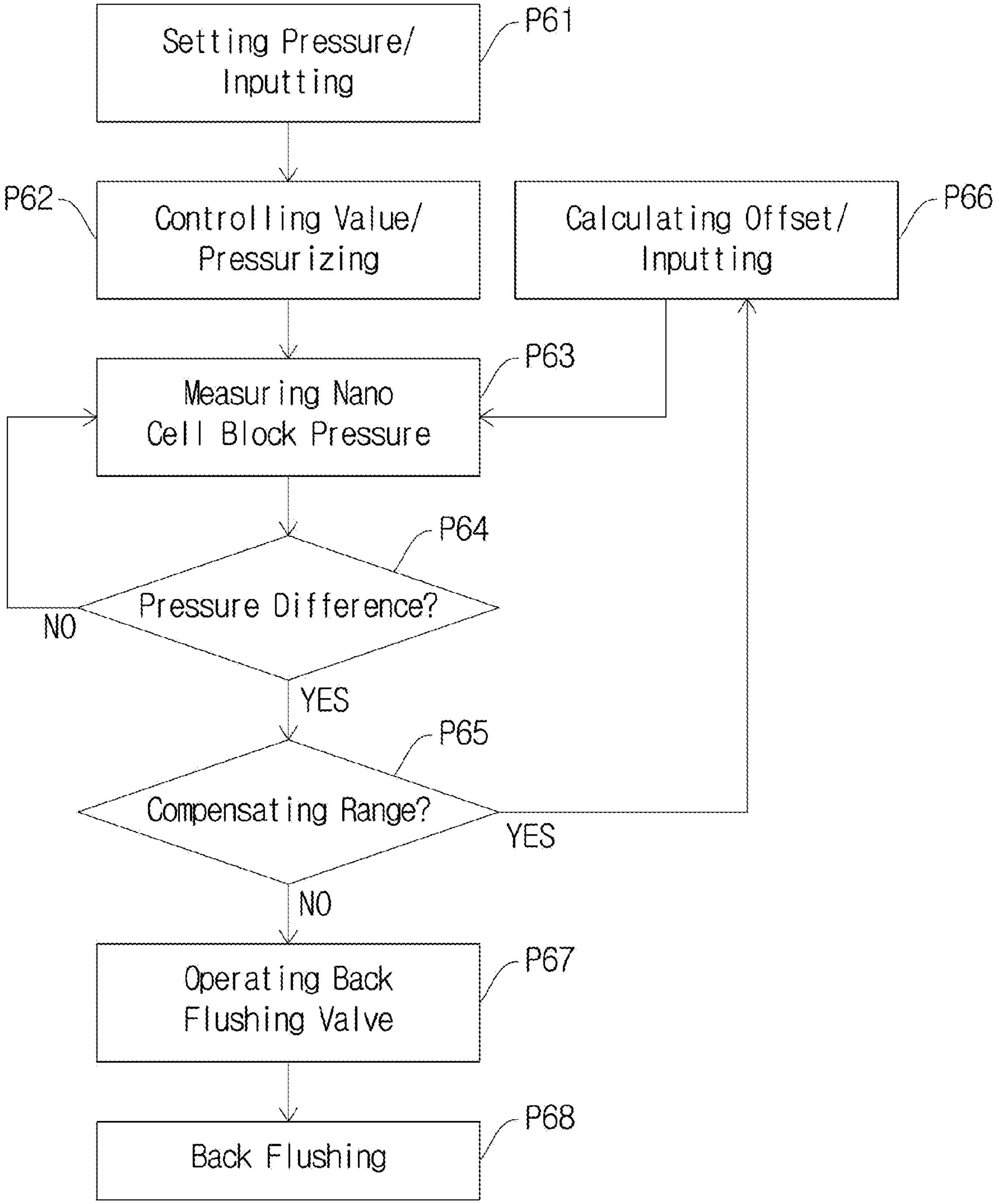
FIG. 6 shows an embodiment of an operating process of the homogenizer according to the present invention.

FIG. 6 shows an embodiment of an operating process of the homogenizer according to the present invention.

Referring to FIG. 6, the operating process of the homogenizer may comprise setting a flowing pressure of the raw material and inputting the set pressure P61; pressurizing the raw material by controlling a controlling valve P62; measuring the pressure of the nano cell block where the raw material flows P63; determining whether the measured pressure has a difference compared with the applied pressure P64; determining whether the difference of the pressure is within a compensable range P65; if the difference of the pressure is out of the range, then operating the back flushing valve P67; and initiating the back flushing process according to the operation of the back flushing valve P68.

At step P64, in case of no difference of the pressure between the measured pressure and the applied pressure, the pressure of nano cell block may be measured. On the contrary, if the difference of pressure occurs, then it is determined that the difference may be offset. At step P65, if the difference is within the compensable range, then the offset may be calculated to input into the controlling valve P66. On the contrary, if the difference is out of the compensable range, the back flushing process may be initiated P68. The process of back flushing P68 may be performed automatically by setting a back flushing initiating condition. For example, an applying pressure or a setting pressure may be determined, and a back flushing initiating pressure may be set. The determined pressure for homogenizing process may be determined and applied to the nano cell block, and the pressure of the nano cell block may be measured in the course of homogenizing by a pressure gauge. A pressure difference calculating module may be installed for calculating the difference between the applied pressure and the measured pressure. If the pressure difference is greater than the back flushing initiating pressure, then the back flushing process may be initiated automatically. And the back flushing process may be performed for a determined time. The homogenizer may be operated in various ways, not limited to.

What is claimed is:

1. A homogenizer for homogenizing a raw material, comprising:
- a first guiding block for guiding the raw material to flow with an operation of a plunger;
- a first flow controlling valve connected to the first guiding block;
- an inflow regulating unit connected to the first flow controlling valve;
- at least one nano cell block for homogenizing the raw material being inputted through the inflow regulating unit;
- a discharge regulating unit for regulating a discharge of the homogenized raw material discharged from the nano cell block;
- a second guiding block installed between the plunger and the first guiding block;

a second flow controlling valve for connecting the second guiding block to the discharge regulating unit;

a heat exchanger connected to the discharge regulating unit; and a detecting unit for detecting a pressure of the nano cell block and the raw material flows through the second flow controlling valve based on a pressure information detected by the detecting unit.

2. The homogenizer according to the claim 1, further comprising: a pressure variation calculating module for calculating a pressure variation of the nano cell block; and a back flushing controlling module for switching a flowing direction of the raw material.

3. The homogenizer according to claim 1, wherein the plunger operates in a proportional manner.

4. The homogenizer according to claim 1, wherein the nano cell block comprises at least two nano cells.

5. The homogenizer according to claim 1, further comprising: an ultrasonic unit installed at the heat exchanger.

6. A homogenizer for homogenizing a raw material, comprising:

a first guiding block for guiding the raw material to flow with an operation of a plunger;

a first flow controlling valve connected to the first guiding block;

an inflow regulating unit connected to the first flow controlling valve;

at least one nano cell block for homogenizing the raw material being inputted through the inflow regulating unit;

a discharge regulating unit for regulating a discharge of the homogenized raw material discharged from the nano cell block;

a second guiding block installed between the plunger and the first guiding block;

a second flow controlling valve for connecting the second guiding block to the discharge regulating unit;

a heat exchanger connected to the discharge regulating unit; and a pressure variation calculating module for calculating a pressure variation of the nano cell block; and a back flushing controlling module for switching a flowing direction of the raw material.

7. A homogenizer for homogenizing a raw material, comprising:

a first guiding block for guiding the raw material to flow with an operation of a plunger;

a first flow controlling valve connected to the first guiding block;

an inflow regulating unit connected to the first flow controlling valve;

at least one nano cell block for homogenizing the raw material being inputted through the inflow regulating unit;

a discharge regulating unit for regulating a discharge of the homogenized raw material discharged from the nano cell block;

a second guiding block installed between the plunger and the first guiding block;

a second flow controlling valve for connecting the second guiding block to the discharge regulating unit;

a heat exchanger connected to the discharge regulating unit; and an ultrasonic unit installed at the heat exchanger.

* * * * *